United States Patent [19]

Hirano et al.

[11] Patent Number: 5,361,365
[45] Date of Patent: Nov. 1, 1994

[54] MICROPROCESSOR FOR SELECTIVELY PERFORMING COLD AND WARM STARTS

[75] Inventors: Takaaki Hirano, Shiki; Yoshinori Hashimoto, Nara, both of Japan

[73] Assignee: Sharp Kabushiki Kaisha, Osaka, Japan

[21] Appl. No.: 24,104

[22] Filed: Feb. 23, 1993

Related U.S. Application Data

[63] Continuation of Ser. No. 604,891, Oct. 30, 1990, abandoned.

[30] Foreign Application Priority Data

Nov. 6, 1989 [JP] Japan .................................. 1-289081
Nov. 6, 1989 [JP] Japan .................................. 1-289082

[51] Int. Cl.$^5$ .............................................. G06F 9/06
[52] U.S. Cl. ................................... 395/775; 395/700; 364/280; 364/280.2; 364/DIG. 1
[58] Field of Search ............... 395/775, 425, 725, 700, 395/934; 371/11.3; 380/4

[56] References Cited

U.S. PATENT DOCUMENTS

| | | | |
|---|---|---|---|
| 4,860,196 | 8/1989 | Wengert | 395/550 |
| 5,012,409 | 4/1991 | Fletcher | 395/650 |
| 5,018,062 | 5/1991 | Culler | 395/425 |
| 5,050,098 | 9/1991 | Brown | 395/112 |
| 5,115,511 | 5/1992 | Nilsson et al. | 395/800 |
| 5,210,875 | 5/1993 | Bealkowski et al. | 395/700 |
| 5,214,695 | 5/1993 | Arnold et al. | 380/4 |

Primary Examiner—Gopal C. Ray
Attorney, Agent, or Firm—Nixon & Vanderhye

[57] ABSTRACT

Upon power-on, a microprocessor is reset and initiates a cold start initialization program stored in ROM for initializing the microprocessor and associated peripherals. Thereafter, externally input control signals to the microprocessor indicate a desirable initialization operation for a warm start when the microprocessor is subsequently reset by an operator. A reset address generating circuit generates (1) a first address setting signal to set a first starting address of the initialization program for a cold start when receiving the reset signal at a power-ON or (2) a second address setting signal to set a second starting address of the initialization program corresponding to the warm start after the power-ON when receiving both a reset signal and a control signal generated externally by a user. A program counter is then set to an address corresponding to the inputted address setting signal. The microprocessor reads and executes initialization programs based on instructions in memory addressed by the program counter.

12 Claims, 8 Drawing Sheets

MICROPROCESSOR FOR SELECTIVELY PERFORMING COLD AND WARM STARTS

This is a continuation of application Ser. No. 07/604,891, filed Oct. 30, 1990, now abandoned.

BACKGROUND OF THE INVENTION

1. Field of the Invention

The present invention relates to a microprocessor which is used in various kinds of electronics apparatuses.

RELATED APPLICATION

This application is related to the commonly assigned copending application Ser. No. 07/544,538 filed Jun. 25, 1990 entitled "Electronics Apparatus and Method of Resuming Operation in the Same" naming Hirano as sole inventor.

2. Description of the Related Art

In a computer system, the start of a program execution by resetting the computer system at a power-ON action of the computer system is called as a "cold start". On the other hand, the start of the program execution by resetting the system after the cold start, while the computer system is kept to be powered-ON, is called as a "warm start".

In the cold start, an initialization program for initializing the peripheral devices such as a printer, CRT (Cathode Ray Tube) terminal and so on arranged in the computer system, is executed after the power-ON of the computer system. In many occasions, only one time execution of this kind of process for the initialization at the power-ON action of the computer system is enough to continue the following execution of the program.

The initialization program for this cold start is written in the ROM (Read Only Memory) in case of a microcomputer system.

In case of a microprocessor, in order to enable the warm start after the cold start, a certain external hardware is additionally required. This certain external hardware is adapted to change, after the completion of the initialization by the cold start, the reset address set in the address map of the ROM for the cold start, to another reset address for the warm start. Such a reset address for the warm start is written in another memory block. Another memory block may be a RAM (Random Access Memory) which is connected with the microprocessor and is loaded with a main program from an external storing device, such as a floppy disk device.

As described above, the microprocessor is constructed such that only the start of the program execution from the specific address, that is to say, the cold start, is enabled by a reset input. Thus, in order to perform the cold start and the warm start selectively or distinguishably, the addition of the external hardware is necessary.

Accordingly, if many kinds of warm starts are requested to be selectively or distinguishably performed besides the cold start, so as to deal with different kinds of possible reset conditions and to change the reset address according to the reset condition, the additional external hardware becomes very complicated.

SUMMARY OF THE INVENTION

It is therefore an object of the present invention to provide microprocessor in which the cold start and the warm start can be selectively performed.

According to the present invention, the object can be achieved by a first microprocessor for executing various kinds of programs including an initialization program stored in a memory, to which a control signal to indicate a desirable initialization operation for a warm start and a reset signal to reset the microprocessor are externally inputted. The first microprocessor includes a reset address generating circuit. The generating circuit receives the control signal and the reset signal, and generates one address setting signal to set one execution starting address of the initialization program for a cold start when receiving the reset signal at a power-ON action of the microprocessor. The generating circuit also samples the control signal while the reset signal is present or when the reset signal is cancelled, and generates another address setting signal to set another execution starting address of the initialization program corresponding to a logical level of the control signal when receiving the reset signal after the power-ON of the microprocessor. The first microprocessor also includes a command fetching program counter, to which the generated address setting signal is inputted and in which an address data corresponding to the inputted address setting signal is set as an initial value, for performing a program counting operation from the initial value. The first microprocessor further includes an execution device for reading and executing the initialization program according to the program counting operation.

According to the present invention, the object can be also achieved by a second microprocessor for executing various kinds of programs including an initialization program stored in a memory, to which a reset signal to reset the microprocessor is externally inputted. The second microprocessor includes an auto-reset circuit for generating an auto-reset signal at a power-ON action of the microprocessor, and a register, to which a control signal of logical state corresponding to a desirable execution starting address of the initialization program for a warm start is given after the power-ON of the microprocessor. The register holds the given control signal of logical level, and is adapted to be reset to a condition to hold another signal of logical level corresponding to a specific execution starting address of the initialization program for a cold start when receiving the auto-reset signal. The second microprocessor also includes a reset address generating circuit, to which the reset signal and the signal held by the register are inputted, for generating an address setting signal corresponding to the signal held by the register when receiving the reset signal. The second microprocessor also includes a command fetching program counter, to which the generated address setting signal is inputted and in which an address data corresponding to the inputted address setting signal is set as an initial value, for performing a program counting operation from the initial value. The second microprocessor further includes an execution device for reading and executing the initialization program according to the program counting operation.

In the first microprocessor, on one hand, when the generating circuit receives the reset signal at the power-ON action of the microprocessor, the generating circuit generates the address setting signal to set the execution starting address of the initialization program for the cold start. Thus, while the program counter performs the program counting operation from the set initial value corresponding to the inputted address setting signal, the executing device can execute the initialization program for the cold start.

On the other hand, when the generating circuit receives the reset signal after the power-ON of the microprocessor, the generating circuit generates the address setting signal to set the execution starting address of the initialization program corresponding to the logical level of the received control signal. Thus, while the program counter performs the program counting operation from the set initial value corresponding to the inputted address setting signal, the executing device can execute the initialization program for the warm start.

Accordingly, in the first microprocessor of the present invention, the cold start and the warm start can be selectively and distinguishably performed.

In the second microprocessor, on one hand, when the auto-reset circuit generates the auto-reset signal at the power-ON action of the microprocessor, the register is reset to the condition to hold the signal of logical level corresponding to the specific execution starting address of the initialization program for the cold start. Then, the generating circuit generates the address setting signal to set the execution starting address of the initialization program for the cold start. Thus, while the program counter performs the program counting operation from the set initial value corresponding to the inputted address setting signal, the executing device can execute the initialization program for the cold start.

On the other hand, after the power-ON of the microprocessor, the register holds the given control signal of logical state corresponding to the desirable execution starting address of the initialization program for the warm start. When the generating circuit receives the reset signal, the generating circuit generates the address setting signal to set the execution starting address of the initialization program for the warm start. Thus, while the program counter performs the program counting operation from the set initial value corresponding to the inputted address setting signal, the executing device can execute the initialization program for the warm start.

Accordingly, in the second microprocessor of the present invention, the cold start and the warm start can be selectively and distinguishably performed.

Further objects and advantages of the present invention will be apparent from the following description of the preferred embodiment of the invention as illustrated in the accompanying drawings.

DETAILED DESCRIPTION OF THE PREFERRED EMBODIMENT

A preferred embodiment of the present invention will be described below with reference to the accompanying drawings.

Figure 1:
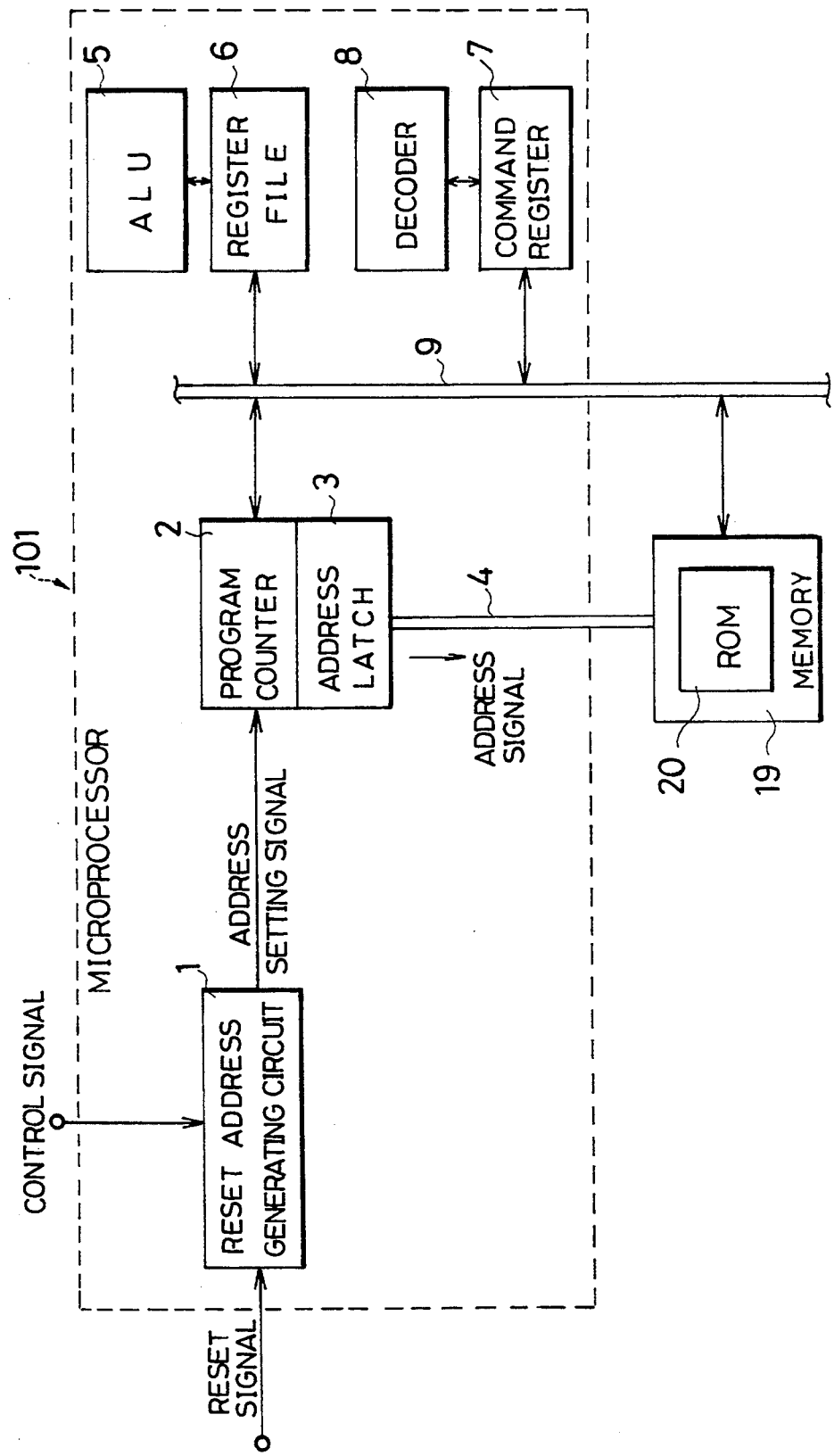
FIG. 1 is a block diagram showing a first embodiment of the present invention.

FIG. 1 shows a microprocessor 101 of a first embodiment according to the present invention.

In FIG. 1, the microprocessor 101 is provided with a reset address generating circuit 1.

The generating circuit 1 is a circuit having a function of selectively generating one address setting signal, which is for setting an execution starting address of an initialization program for the cold start at a power-ON action of the microprocessor 101, and another address setting signal, which is for re-initializing i.e. setting an execution starting address of the initialization program for the warm start, based on the control signal.

The control signal is externally inputted, for example, by a switch input operation etc. by a user. Such a control signal may indicate one desirable initialization operation out of a plurality of initialization operations prescribed in advance.

Namely, on one hand, when the generating circuit 1 receives a reset signal at the power-ON action of the microprocessor 101, that is to say, when the reset signal is turned to be at a high level at the power-ON action of the microprocessor 101, the generating circuit 1 generates an address setting signal for setting an execution starting address for the cold start. Then, at a timing of the reset cancellation, that is to say, when the reset signal is turned to be at a low level, the generating circuit 1 output this generated address setting signal.

On the other hand, when the generating circuit 1 receives a reset signal after the cold start, the generating circuit 1 samples, during the reset period (when the reset signal is at a high level) or at a timing of the reset cancellation, one or more than one of inputted control signals. The control signal is inputted during the reset period from the external of the microprocessor 101 and indicates a certain kind of re-initialization by its logical state. Then, the generating circuit 1 generates and output an address setting signal for setting an execution starting address for the warm start corresponding to the logical state of the inputted control signal after the reset cancellation.

The microprocessor 101 is also provided with a command fetching program counter 2, an address latch 3 and an address bus line 4.

The program counter 2 is a circuit for command fetching and connected to the output of the generating circuit 1. The program counter 2 receives the address setting signal from the generating circuit 1. Then, the address data corresponding to the received address setting signal is set in the program counter 2 as the initial value for the following program execution in the microprocessor 101. Then, the program counter 2 transmits the set address data to a ROM 20 in a memory 19 through an address latch 3 and an address bus line 4.

The ROM 20 is written with various kinds of programs including the initialization program. The memory 19 may include a RAM (Random Access Memory) to which various kinds of programs to be performed by the microprocessor 101 are loaded from a peripheral devices such as a floppy disk device. The memory 19 is disposed outside of the microprocessor 101 in this embodiment, but this may be disposed within the microprocessor 101. Alternatively, only the ROM 20 may be disposed within the microprocessor 101 while other portion of the memory 19 is disposed outside of the microprocessor 101.

A data bus line 9 is provided in the microprocessor 101. The data bus line 9 extends to the outside of the microprocessor 101 such that the data communications of various kinds of data, including arithmetic data and a command data, can be transmitted inside and outside of the microprocessor 101 therethrough. The program counter 2 and the memory 19 are connected to the data bus line 9.

An ALU (Arithmetic Logic Unit) 5 is a circuit having a function of performing calculation processes of various kinds.

A register file 6 is disposed between the ALU 5 and the data bus line 9. The register file 6 is a circuit for storing the result of the calculation by the ALU 5.

A command register 7 is also connected to the data bus line 9. The command register 7 is a register for receiving the command, which is read out of the memory 19 through the data bus line 9, and for temporarily holding the received command in order to execute the command.

A decoder 8 is connected to the command register 7. The decoder 8 is a circuit for decoding the command held by the command register 7.

The execution starting operation of the initialization program in the above mentioned microprocessor 101 will be explained below.

When the reset signal is input to the generating circuit 1 at the power-ON action of the microprocessor 101, the address setting signal for setting the execution starting address of the initialization program for the cold start is outputted from the generating circuit 1 after the reset cancellation.

Then, in the program counter 2, the address data corresponding to this address setting signal from the generating circuit 1 is set as the initial value. While the program counter 2 performs its counting operation from this initial value, the address signal is transmitted from the program counter 2 to the ROM 20 through the address latch 3 and the address bus line 4, thus the cold start is performed.

When the reset signal is given by, for example, a switch input operation by the user after the above mentioned cold start, and at the same time when one or more than one of certain control signals for indicating a certain kind of re-initialization, is given from the external of the microprocessor 101, the generating circuit 1 samples the inputted control signal during the reset period or at the timing of the reset cancellation.

After the reset cancellation, an address setting signal, for setting an execution starting address of the initialization program corresponding to the logical state of the inputted control signal, is outputted from the generating circuit 1.

In the program counter 2, the address data corresponding to this address setting signal is set as the initial value. While the program counter 2 performs its counting operation from this initial value, the address signal is transmitted from the program counter 2 to the ROM 20 through the address latch 3 and the address bus line 4, thus the corresponding warm start is performed.

As described above, in the microprocessor 101 of the present embodiment, the cold start and the warm start can be selectively and distinguishably performed.

Figure 2:
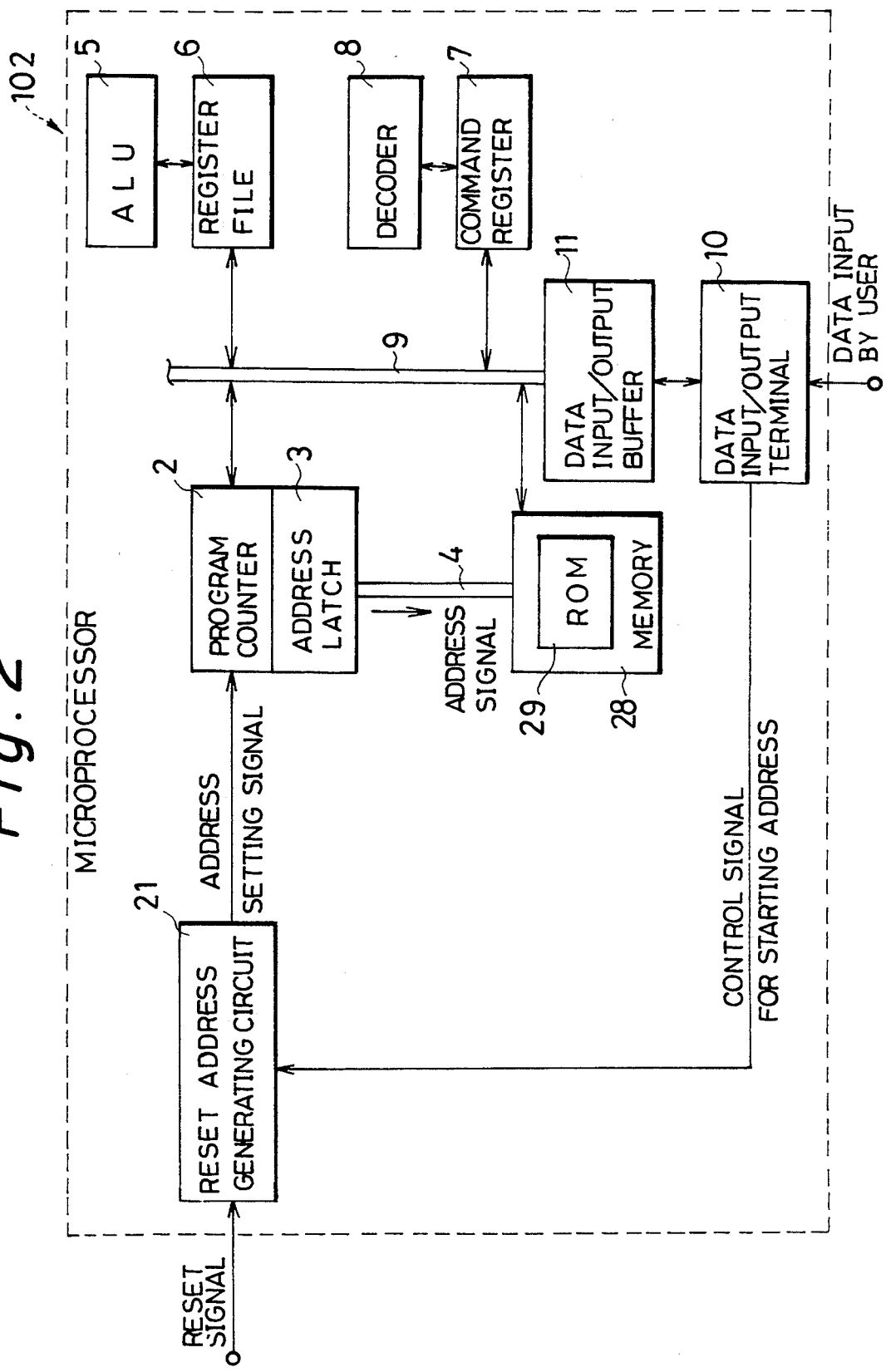
FIG. 2 is a block diagram showing a second embodiment of the present invention.

FIG. 2 shows a microprocessor of a second embodiment according to the present invention. In FIG. 2, the same elements as those in FIG. 1 carry the same reference numerals and the explanations thereof are omitted.

In FIG. 2, the microprocessor 102 is provided with a data input/output terminal 10 and a data input/output buffer 11.

The difference between the first embodiment and the second embodiment is that the reset address generating circuit 21, in the second embodiment, receives, as control signals, one or more than one of inputted data given through the input/output terminal 10 by the user, instead of the control signal of the first embodiment. The inputted data indicates the desirable execution starting address to be set in the generating circuit 21.

The input/output buffer 11 is a register for temporarily holding data inputted to and outputted from the input/output terminal 10.

A memory 28 including a ROM 29 is disposed within the microprocessor 102 and is connected to the address bus line 4 and the data bus line 9. The memory 28 and the ROM 29 have the same functions as those of the memory 19 and the ROM 20 of the first embodiment. The memory 28 is disposed within the microprocessor 102 in this embodiment, but this may be disposed outside of the microprocessor 102.

Thus, in the second embodiment, the cold start and the warm start can be selectively and distinguishably performed in the same manner as the first embodiment.

Figure 3:
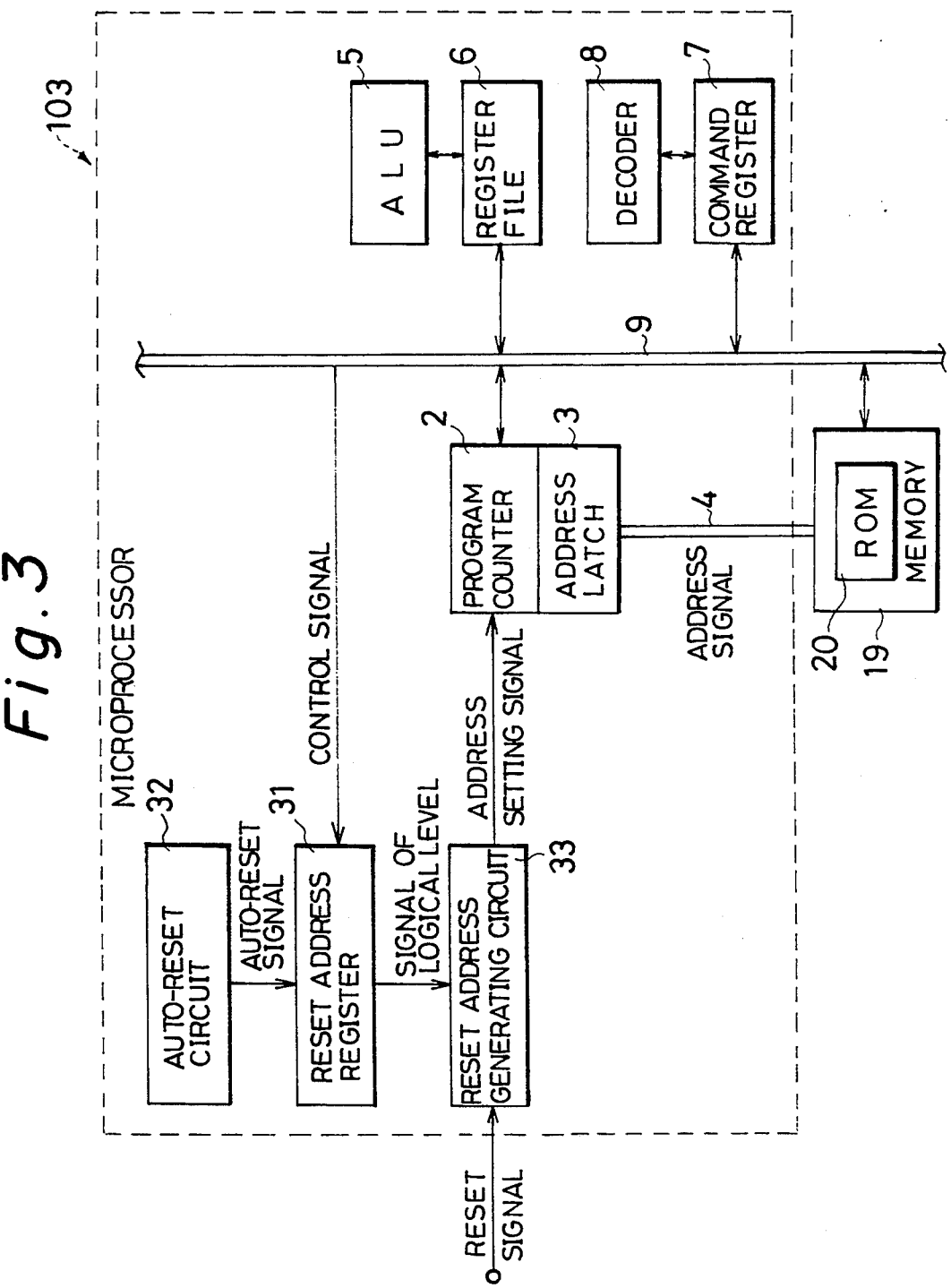
FIG. 3 is a block diagram showing a third embodiment of the present invention.

FIG. 3 shows a microprocessor of a third embodiment according to the present invention. In FIG. 3, the same elements as those in FIGS. 1 and 2 carry the same reference numerals and the explanations thereof are omitted.

In FIG. 3, the microprocessor 103 is provided with a reset address register 31, an auto-reset circuit 32 and a reset address generating circuit 33.

The address register 31 is adapted to hold a control signal of certain logical level corresponding to any desirable execution starting address of the initialization program for the warm start. This control signal of certain logical level is given through the data bus line 9 by a user after the power-ON of the microprocessor 103 in order to perform the desirable warm start.

The address register 31 is also adapted to be reset to a state holding a signal of another logical level corresponding to the specific execution starting address of the initialization program for the cold start, when an auto-reset signal is inputted from the auto-reset circuit 32 thereto.

The address register 31 may be composed of EPROM (Erasable Programmable ROM) or RAM such that the EPROM or RAM in its reset state is prescribed to hold the above mentioned signal of logical level for the cold start and the warm start. The address register 31 may be composed of other electronics devices of same type as the EPROM or RAM.

The auto-reset circuit 32 is a circuit for outputting the auto-reset signal to the reset address register 31 so as to reset the address register 31 when the microprocessor 103 is powered-ON.

The reset address generating circuit 33 is a circuit having a function of generating an address setting signal corresponding to the logical level of the signal held in the address register 31 when the generating circuit 33 receives a reset signal. The generating circuit 33 output the address setting signal to program counter 2.

The execution starting operation of the initialization program in the above mentioned microprocessor 103 will be explained below.

At the power-ON action of the microprocessor 103, the auto-reset signal is given to the address register 31 from the auto-reset circuit 32. By this auto-reset signal, the address register 31 is reset to the state to hold the signal of logical level corresponding to the execution starting address of the initialization program for the cold start.

On the other hand, at the power-ON action of the microprocessor 103, the reset signal is inputted to the generating circuit 33. At this time, the generating circuit 33 generates the address setting signal corresponding to the logical level of the signal held in the address register 31.

Then, the address data corresponding to this address setting signal, that is, the execution starting address of the initialization program for the cold start, is set as the initial value in the program counter 2. Then, after the reset cancellation, while the program counter 2 performs its counting operation from this initial value, the address signal is transmitted from the program counter 2 to the ROM 20 through the address latch 3 and the address bus line 4, and thus the cold start is performed.

When the reset signal is given to the generating circuit 33 by, for example, a switch input operation by the user after the above mentioned cold start, the address register 31 is already released from the reset state and is made in another state to hold the control signal of logical level corresponding to the execution starting address for the desirable warm start prescribed by the user.

Thus, the generating circuit 33 generates address setting signal corresponding to the logical level of the signal held in the address register 31, when receiving the reset signal.

In the program counter 2, the address data corresponding to this address setting signal, that is, the execution starting address of the initialization program for the warm start, is set as the initial value. While the program counter 2 performs its counting operation from this initial value, the address signal is transmitted from the program counter 2 to the ROM 20 through the address latch 3 and the address bus line 4, thus the corresponding warm start is performed after the reset cancellation.

As described above, in the microprocessor 103 of the present embodiment, the cold start and the warm start can be selectively and distinguishably performed.

Constructional examples of the reset address generating circuit and the program counter, which can be used in the above described first, second and third embodiments, will be explained with referring to FIGS. 4 to 6, hereinafter.

Figure 4:
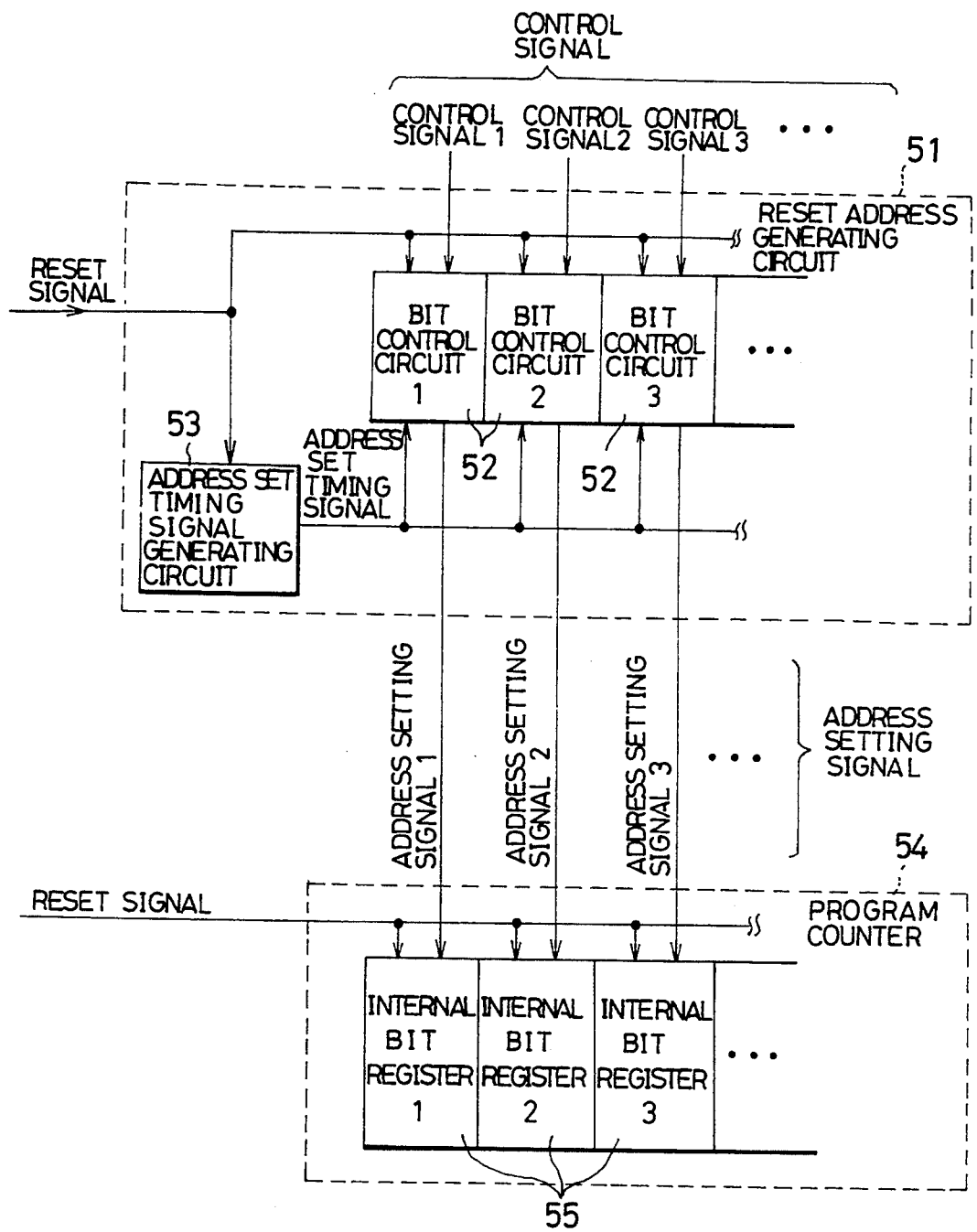
FIG. 4 is a block diagram showing a first constructional example of the reset generating circuit and the program counter in the embodiments of the present invention.

FIG. 4 shows a first constructional example, in which the reset address generating circuit performs a single bit controlling operation with respect to the program counter.

In FIG. 4, a reset address generating circuit 51 is provided with a plurality of bit control circuits 52. Each of the bit control circuits 52 receives the reset signal and the respective control signal.

The generating circuit 51 is also provided with an address set timing signal generating circuit 53, which gives an address set timing signal to each of the bit control circuit 52.

While the bit control circuit 52 receives the address set timing signal, the bit control circuit 52 is active to output each address setting signal.

A program counter 54 is provided with a plurality of internal bit registers 55. Each of the bit registers 55 receives the reset signal and the respective address setting signal. The bit registers 55 are reset to 0 by the reset signal. When the address setting signal is inputted to the bit registers 55, the bit register 55 is set to 1. Alternatively, the program counter 54 may be constructed such that the bit registers 55 are reset to 1 by the reset signal while they are set to 0 by the address setting signal.

Thus, the user can select the desirable bit in the program counter 54 which is to be set to 1 by turning the corresponding control signal to the high level.

Figure 5:
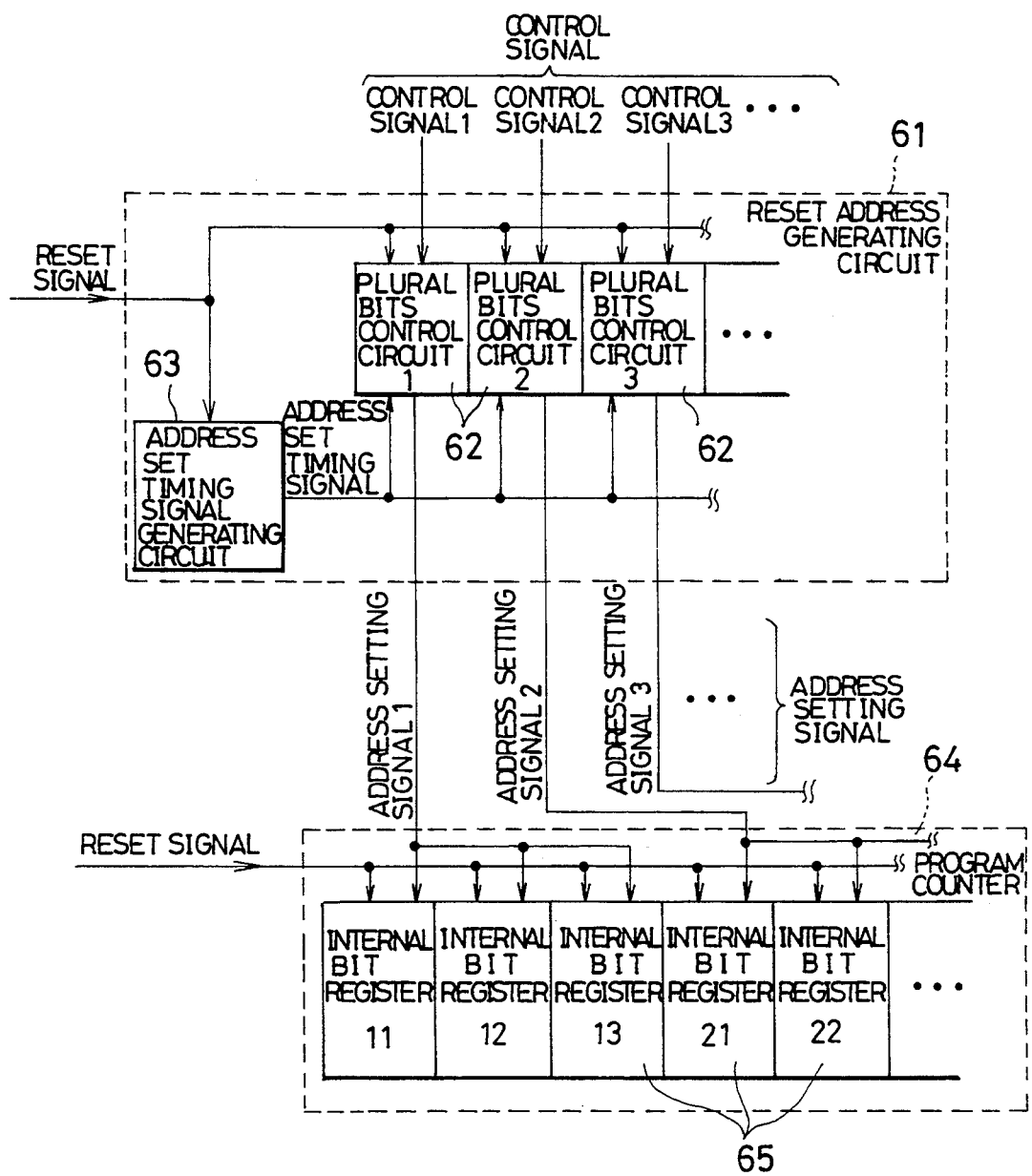
FIG. 5 is a block diagram showing a second constructional example of the reset generating circuit and the program counter in the embodiments of the present invention.

FIG. 5 shows a second constructional example, in which the reset address generating circuit performs a plural bits controlling operation with respect to the program counter.

In FIG. 5, a reset address generating circuit 61 is provided with a plurality of plural bits control circuits 62. Each of the bits control circuits 62 receives the reset signal and the respective control signal.

The generating circuit 61 is also provided with an address set timing signal generating circuit 63, which gives an address set timing signal to each of the bits control circuit 62.

While the bits control circuit 62 receives the address set timing signal, the bits control circuit 62 is active to output the address setting signal.

A program counter 64 is provided with a plurality of internal bit registers 65. Each of the bit registers 65 receives the reset signal and the respective address setting signal.

In the second example especially, each of the address setting signals is inputted to a plurality of the bit registers 65 in a specific way. Thus in the second example, by use of the control signals, which total number is less than that of the first example, the user can select the desirable certain address value in the program counter 64, though the number of different kind of the address value able to be set by the control signal is less than that of the first example.

Figure 6:
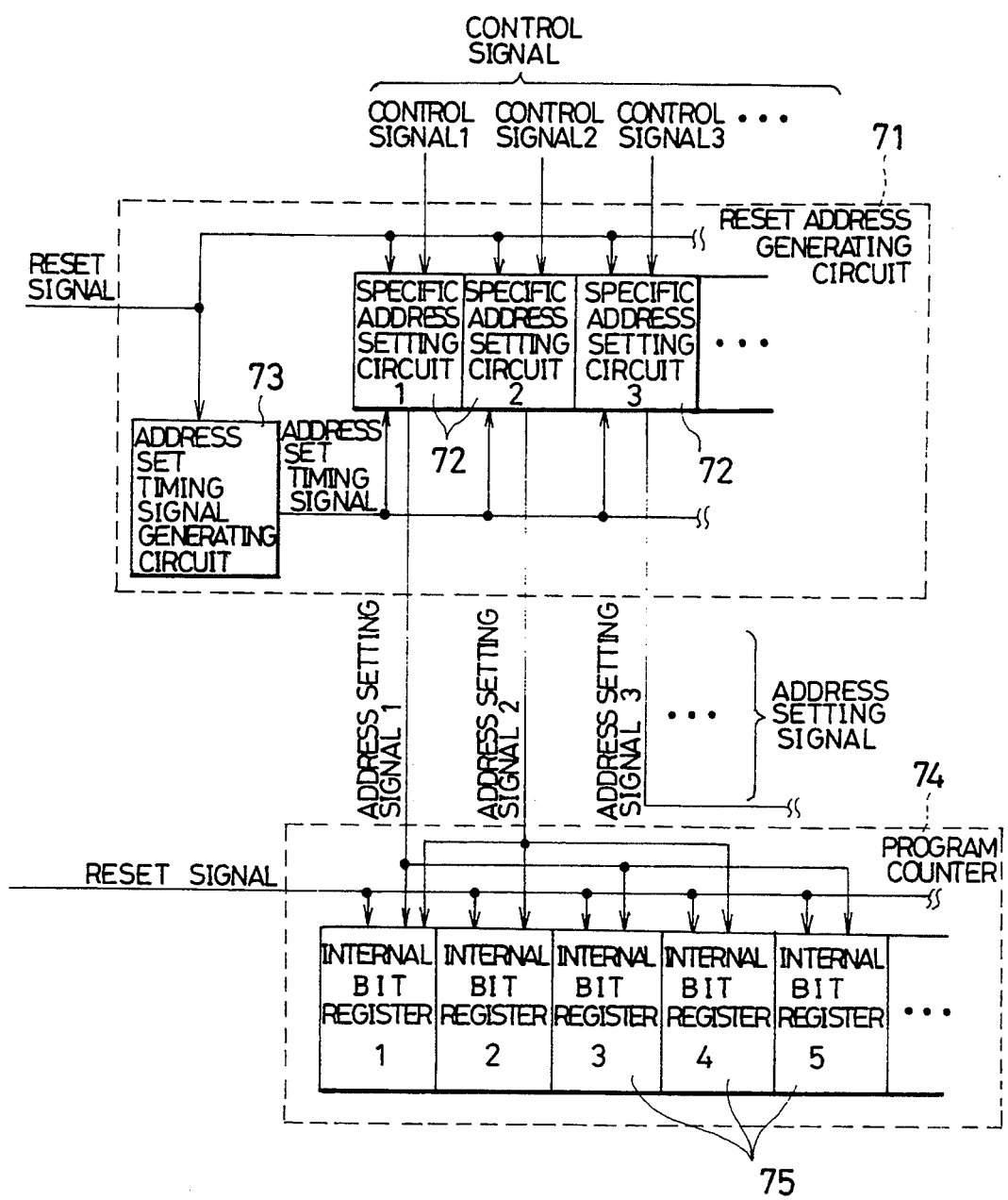
FIG. 6 is a block diagram showing a third constructional example of the reset generating circuit and the program counter in the embodiments of the present invention.

FIG. 6 shows a third constructional example, in which the reset address generating circuit performs a specific address setting operation with respect to the program counter.

In FIG. 6, a reset address generating circuit 71 is provided with a plurality of specific address setting circuits 72. Each of the address setting circuits 72 receives the reset signal and the respective control signal.

The generating circuit 71 is also provided with an address set timing signal generating circuit 73, which gives an address set timing signal to each of the address setting circuits 72.

While the address setting circuit 72 receives the address set timing signal, the address setting circuit 72 is active to output the address setting signal.

A program counter 74 is provided with a plurality of internal bit registers 75. Each of the bit registers 75 receives the reset signal and the address setting signal.

In the third example especially, each of the address setting signals is inputted to a plurality of the bit registers 75 and a plurality of the address setting signals are inputted to one of the bit registers 75 in a specific way by the hardware. Thus, in the third example, by use of the control signals, which total number is less than that of the first example, the user can select the desirable address value which is fixed by the hardware in the program counter 74.

The bit control circuit 52 and the timing signal generating circuit 53 of the above mentioned first example of FIG. 4, will be explained in more detail with referring to FIGS. 7 and 8, hereinafter.

Figure 7:
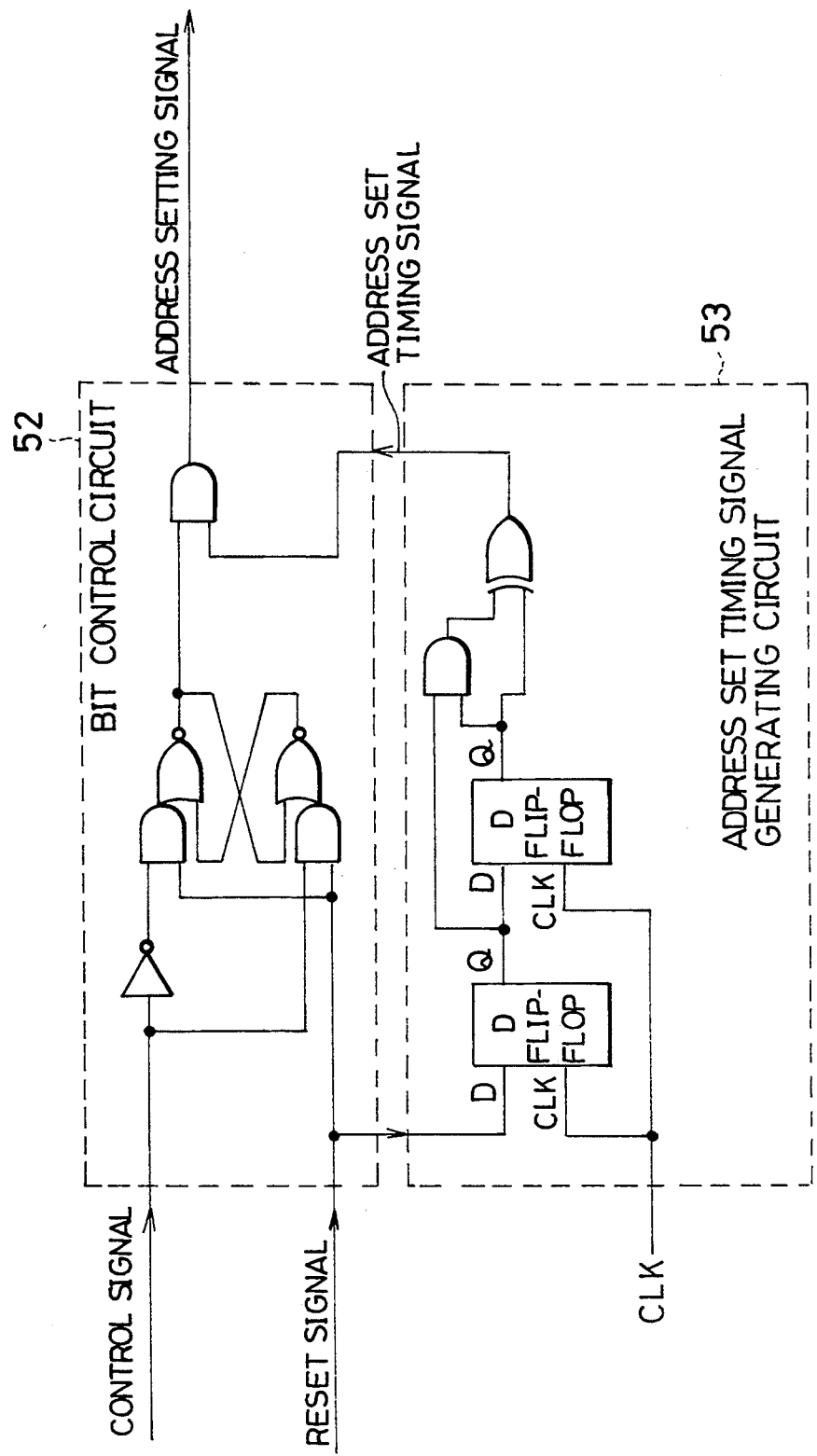
FIG. 7 is a circuit diagram of the bit control circuit and the address set timing signal generating circuit of FIG. 4.
Figure 8:
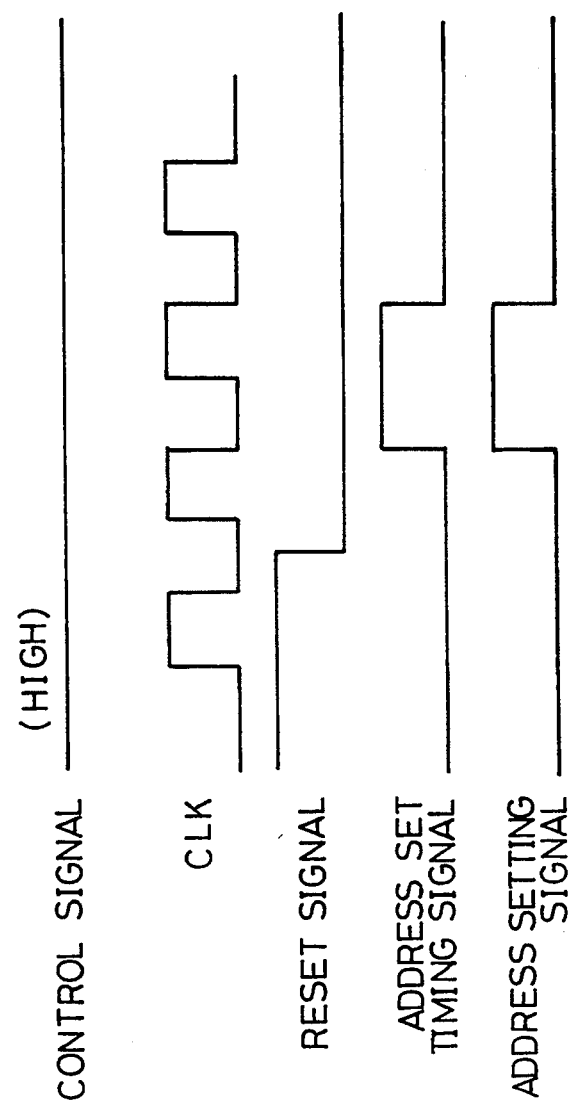
FIG. 8 is a timing chart of the bit control circuit and the address set timing signal generating circuit of FIG. 7.

FIG. 7 shows a circuit diagram of the bit control circuit 52 and the timing signal generating circuit 53, while FIG. 8 shows a timing chart thereof.

In FIG. 7, the bit control circuit 52 is adapted to read the control signal while the reset signal is at the high level, and then outputs the address setting signal after the reset signal is turned to the low level as shown in FIG. 8.

In FIG. 7, the address set timing signal generating circuit 53 outputs the address set timing signal to the bit control circuit 52. The timing of the address setting signal is controlled by the address set timing signal such that the address setting signal is only active during the period of one or two system clock pulses (CLK) as shown in FIG. 8.

The bits control circuit 62 of FIG. 5 and the specific address setting circuit 72 of FIG. 6 may also be constructed and operated in a similar way as the above explained case of the bit control circuit 52.

According to the present embodiments as explained above, the microprocessor can be provided, which is advantageous in performing the cold start and the warm start selectively in a relatively simplified form without introducing an additional and complicated external hardware, and in which the reset operation can be performed very flexibly and thus speedily without executing unnecessary portion of the initialization program.

Many widely different embodiments of the present invention may be constructed without departing from the spirit and scope of the present invention. It should be understood that the present invention is not limited to the specific embodiments described in this specification, except as defined in the appended claims.

What is claimed is:

1. A microprocessor for selectively executing different initialization programs, comprising:
   a memory for storing at least first and second initialization programs, the first initialization program corresponding to a first resetting operation occurring simultaneously with power-on of the microprocessor and having a first starting address, and the second initialization program corresponding to a second resetting operation of the microprocessor subsequent to power on and having a second starting address;
   a program counter for providing one of the first and second addresses to the memory to access a corresponding first or second initialization program to be executed;
   an address generator providing signals corresponding to the first starting address based on a power-on reset signal supplied thereto to set the contents of the program counter to the first starting address and signals corresponding to the second starting address based on received reset and control signals supplied thereto to set the contents of the program counter to the second starting address, the control signals being externally actuated by a user; and
   a logic unit for executing one of the first and second initialization programs based on the starting address generated by the program counter.

2. A microprocessor according to claim 1, in which the address generator includes a plurality of bit control circuits, each of the plurality of bit control circuits generates one bit of the first and second starting addresses.

3. A microprocessor according to claim 2, in which the address generator includes an address set timing signal generating circuit for supplying an address set timing signal to each of the plurality of bit control circuits to cause the plurality of bit control circuits to respectively generate the first and second starting addresses.

4. A microprocessor according to claim 1, in which the program counter includes a plurality of internal bit registers for receiving one of the first and second starting addresses generated by the address generator.

5. A microprocessor according to claim 1, in which the logic unit includes an arithmetic logic unit, a register file, a command decoder and a command register.

6. The microprocessor according to claim 1, wherein the first resetting operation corresponds to a cold start initialization program stored at the first start address, and the second resetting operation corresponds to a warm start reinitialization program stored at the second start address.

7. The microprocessor according to claim 1, wherein the externally produced control signals are specified and input by a user through a data input/output terminal to selectively determine the second start address to be set by the address generator.

8. The microprocessor according to claim 1, further comprising:
   an automatic reset circuit for providing an automatic reset signal corresponding to the first start address, and
   a reset address register for receiving the automatic reset signal and control signals selectively generated by a user and corresponding to the second address,
   wherein the address generator generates the address selection signal based on the reset signal and signals received from the reset address register.

9. The microprocessor according to claim 1, wherein the address generator includes:
   an address timing signal generator for producing an address timing signal, and
   a plurality of individual bit control circuits each receiving the reset signal, the address timing signal and corresponding individual control signals, each bit control circuit generating an address setting signal associated with the corresponding individual control signal when the reset signal and address timing signal achieve a predetermined logic state.

10. The microprocessor according to claim 9, wherein the program counter includes a plurality of internal bit registers, each internal bit register corresponding to one of the bit control circuits and receiving the reset signal and the associated address setting signal generated by the corresponding bit control circuit, wherein the second start address is selectively preset via the individual control signals input to the individual bit control circuits.

11. The microprocessor according to claim 10, wherein the address setting signal from an individual bit control circuit sets the address bits for plural adjacent internal bit registers.

12. The microprocessor according to claim 10, wherein the address setting signal from an individual bit control circuit controls the address value for plural internal bit registers.

* * * * *